United States Patent [19]

Motoyama

[11] Patent Number: 5,548,687
[45] Date of Patent: Aug. 20, 1996

[54] METHOD AND APPARATUS FOR CONTROLLING A PRINTER USING THE N/2$^R$ FORMAT

[75] Inventor: Tetsuro Motoyama, San Jose, Calif.

[73] Assignees: Ricoh Company, Ltd., Tokyo, Japan; Ricoh Corporation, San Jose, Calif.

[21] Appl. No.: 986,790

[22] Filed: Dec. 8, 1992

Related U.S. Application Data

[63] Continuation-in-part of Ser. No. 931,808, Aug. 11, 1992, Pat. No. 5,416,896, which is a continuation-in-part of Ser. No. 876,601, Apr. 30, 1992, Pat. No. 5,319,748, and a continuation-in-part of Ser. No. 876,251, Apr. 30, 1992, Pat. No. 5,325,484.

[51] Int. Cl.$^6$ ................................................ H03M 7/00
[52] U.S. Cl. .............................. 395/101; 395/114
[58] Field of Search .................................. 395/114, 101, 395/115, 108, 110, 117

[56] References Cited

U.S. PATENT DOCUMENTS

| | | | |
|---|---|---|---|
| 4,464,650 | 8/1984 | Eastman et al. | 340/347 |
| 4,664,541 | 5/1987 | Stefani | 395/108 |
| 4,876,541 | 10/1989 | Storer | 341/51 |
| 4,942,390 | 7/1990 | Do et al. | 395/114 |
| 5,027,376 | 6/1991 | Friedman et al. | 375/122 |
| 5,150,454 | 9/1992 | Wood et al. | 395/114 |
| 5,199,803 | 4/1993 | Shimizu et al. | 395/110 |
| 5,207,517 | 5/1993 | Ito | 395/108 |
| 5,268,993 | 12/1993 | Ikenove et al. | 395/114 |

OTHER PUBLICATIONS

Section 25.2 of "ISO/IEC DIS 10180, Information Processing–Text Communication–Standard PDL Page Description Language," Mar., 1991.

*Primary Examiner*—Raymond J. Bayerl
*Assistant Examiner*—Steven P. Sax
*Attorney, Agent, or Firm*—Oblon, Spivak, McClelland, Maier & Neustadt, P.C.

[57] ABSTRACT

A system for compressing numbers represented in clear text format of a Standard Page Description Language (SPDL) in which numbers are compressed to a binary format represented by N/2$^r$. Only numbers which are integers or have a decimal portion following a certain format can be compressed using this format. If the number is an integer, it could be converted setting N equal to the number and r equal to zero. If the number contains a decimal portion, the number is doubled and then checked to see if it has become an integer. If it has not become an integer, it is repeatedly doubled until the integer portion N or r go out of range. A second embodiment of the compression system operates in a similar manner if the number to be compressed is an integer. If it is not an integer, the decimal portion of the number is broken into groups having four consecutive digits. The right most group of digits is examined to determine if it is characteristics which allow compression using the N/2$^r$ format. If the proper characteristics exists, the right most group of digits is multiplied by a power of two which results in a product having zeros in the ones, tens, hundreds, and thousands positions. This process continues until all groups of digits to the right of the decimal are eliminated or a group of digits is encountered which does not permit compression into the N/2$^r$ format.

25 Claims, 11 Drawing Sheets

FIG. 1A
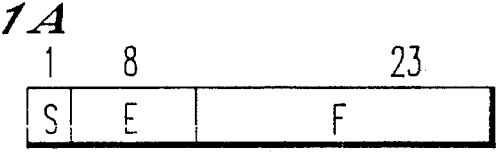
SINGLE PRECISION IEEE 754 FLOATING POINT
FIG. 1B
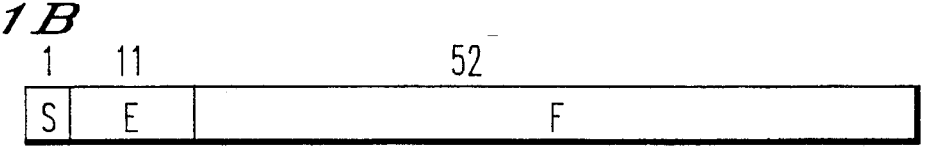
DOUBLE PRECISION IEEE 754 FLOATING POINT
FIG. 2A
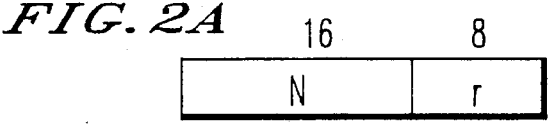
SINGLE PRECISION $N/2^R$
FIG. 2B
DOUBLE PRECISION $N/2^r$
FIG. 3A
567.125
TEXTUAL REPRESENTATION
FIG. 3B
35 36 37 2D 31 32 35 H
ASCII REPRESENTATION
FIG. 3C
44 0D C8 00 H
SINGLE PRECISION IEEE 754 REPRESENTATION
FIG. 3D
11 B9 03 H
SINGLE PRECISION $N/2^r$ REPRESENTATION

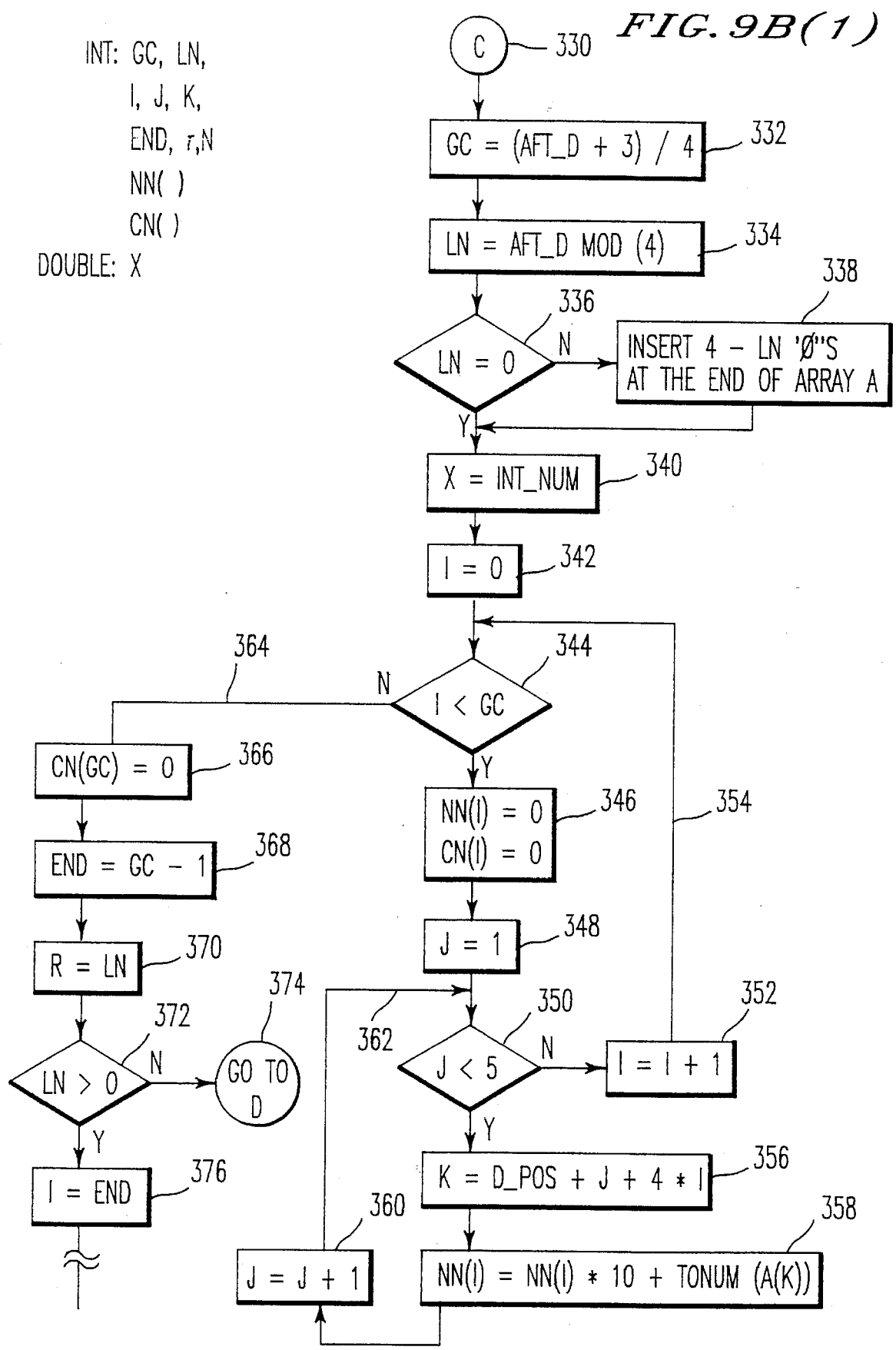
FIG. 9B(1)

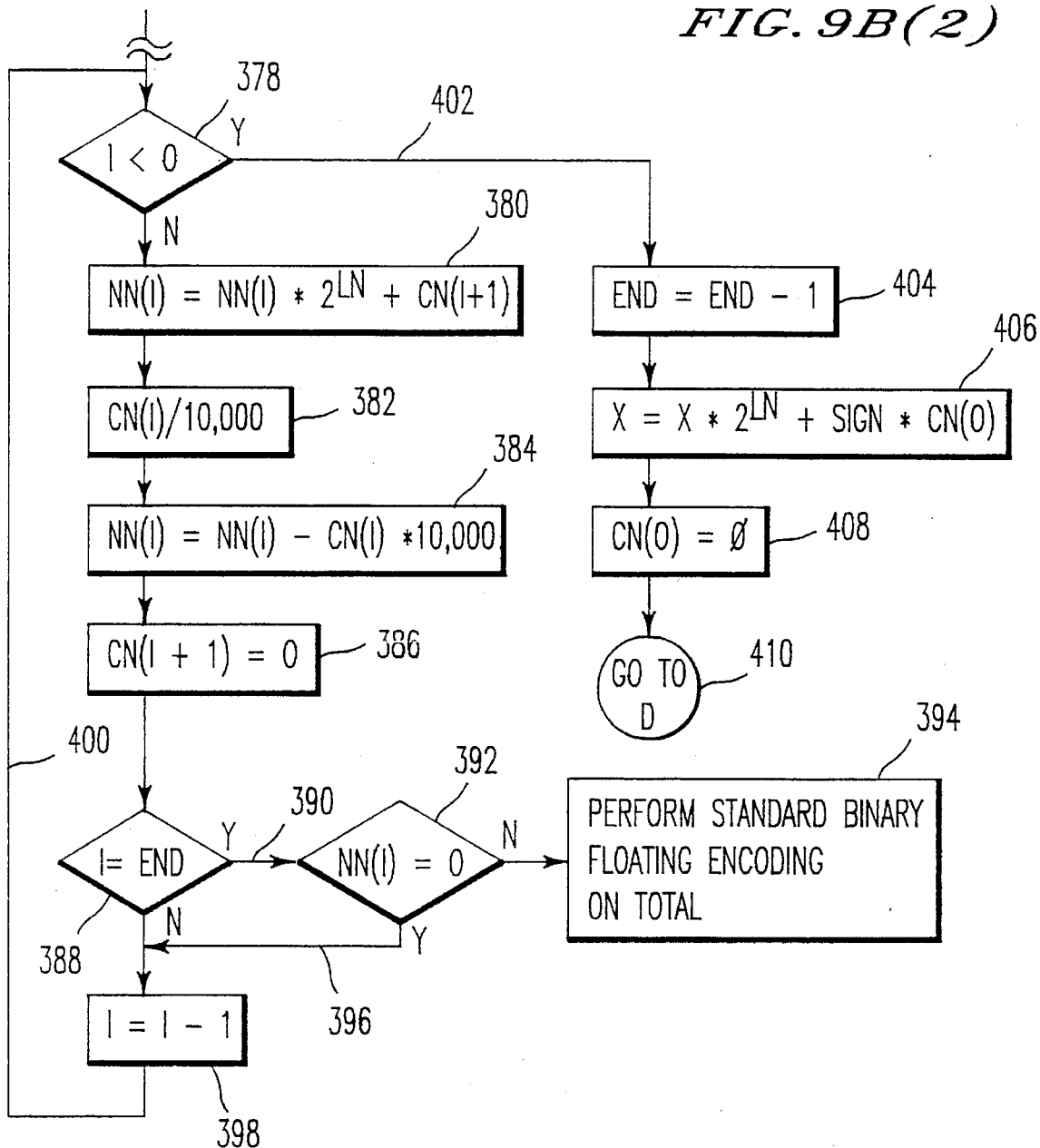
FIG. 9B(2)

METHOD AND APPARATUS FOR CONTROLLING A PRINTER USING THE. N/2$^R$ FORMAT

CROSS-REFERENCES TO RELATED APPLICATIONS

This application is a continuation-in-part of U.S. patent application Ser. No. 07/931,808, now U.S. Pat. No. 5,416, 896 filed on Aug. 11, 1992 and entitled "A Method And System to Handle Dictionary Generation and Context Declaration in a Document Processing Language" which is a continuation-in-part of U.S. patent applications, Ser. No. 07/876,601, now U.S. Pat. No. 5,319,748, and Ser. No. 07/876,251, now U.S. Pat. No. 5,325,484 both filed on Apr. 30, 1992 and entitled "Method and Apparatus to Manage Picture and Pageset for Document Processing" and "Method and System to Handle Inclusion of External Files into a Document Processing Language," respectively.

BACKGROUND OF THE INVENTION

1. Field of the Invention

This invention relates generally to the control of a printer and to the compression and encoding of information sent to a printer. In this context, a printer is not only envisaged as a conventional computer printer but also as a remote fax printer or other types of display or presentation devices. This invention particularly relates to a system and method for compressing and encoding numeric data represented in a clear text Standard Page Description Language (SPDL) to the N/2$^r$ binary format.

2. Discussion of the Background

A large amount of information is sent every day to printers throughout the world. It is often desired to have information printed faster and ready for use sooner in today's hectic office environments. Data compression systems are known in the prior art that encode a stream of digital data signals into compressed digital code signals and decode the compressed digital code signals back into the original data. The object of data compression systems is to effect a savings in the amount of storage required to hold or the amount of time required to transmit a given body of digital information. By decreasing the required memory for data storage or the required time for data transmission, compression results in a monetary savings. If tapes or disks are utilized to store data files, then fewer tapes or disks are required for storing compressed files. If telephone lines or satellite links are utilized for transmitting digital information, lower costs result when the data is compressed before transmission as a smaller amount of transmission time is required.

For example, it may be desired to transmit the contents of a daily newspaper or weekly newsletter via satellite link or telephone line to a remote location for printing. Appropriate devices may convert the contents of the newspaper and newsletter into a data stream of characters for transmission via the communication link. If the symbols comprising the contents of the newspaper or newsletter were compressed before transmission and reconstituted at the receiver, a significant amount of transmission time is saved.

As a further example, when an extensive collection of documents such as wordprocessing data files on a network file server of a large corporation are stored for archival purposes, a significant amount of storage space would be saved if the totality of symbol signals comprising the documents were compressed prior to storage and reexpanded from the stored compressed files for later use.

A fundamental requirement for compression of digital data is that the compression system must be reversible. That is, it must be possible to reexpand or decode the compressed data back into its original form without any alteration or loss of information. The decoded and the original data must be identical and indistinguishable with respect to each other.

One of the best known and most widely used general purpose data compression procedures is the Lempel, Ziv et al system, hereinafter the "LZ" system and disclosed in U.S. Pat. No. 4,464,650. The LZ system is a lossless, dynamic, on-line system for compression of textual data. The LZ system involves storing frequently-appearing string of characters in memory. A pointer to the stored string of characters is transmitted in place of the full string when a new string of characters appears in the input string that matches the stored stream of characters. When a string of characters appears in the input stream that matches a stored string of characters, but also includes a string of one or more characters, the pointer for the matched string is transmitted along with the first character of the new string of characters, with the first character being transmitted in uncompressed form.

However, a problem with the LZ data compression system is that the technique typically requires large amounts of computer memory and processing time. Additionally, once the memory which stores the strings of characters which are often repeated is full, the Lempel and Ziv method has difficulty in dynamically changing the repeated strings of characters.

Storer discloses in U.S. Pat. No. 4,876,541 a data compression system which overcomes the problems in the Lempel et al patent and enables updating of frequently appearing strings of characters which are compressed. In Storer's data compression system, both the encoder and decoder have dictionaries for storing frequently appearing strings of characters. Each string is identified by a unique pointer. The input data string is parsed and matched with strings in the encoder dictionary using a matching algorithm. The pointer associated with the matched string is then transmitted to a remote location for storage or decoding. Thereafter, using the update algorithm, the encoder dictionary is updated to include new strings of data based on the matched string of data.

An alternative form of data compression is set forth in U.S. Pat. No. 5,027,376 by Friedman et al and assigned to Microcom Systems, Inc. Friedman's compression system is used in MNP (Microm Networking Protocol) modems. In Friedman's systems, the compressing modem receives an input data stream and each character in the data stream is recodified with a compressed character code, the length of which is dependent on the frequency of the characters in the data stream. A frequency table is maintained so that changes in the relative frequency of characters in the data stream will be recognized by the compressing modem and the compressed characters representing such characters will be exchanged accordingly. A decompressing modem, connected over communication lines to the compressing modem, processes the compressed character code in a reverse order from the manner in which the compressing modem processes the codes. The decompressing modem also has a relative frequency table and as the relative frequencies of the various characters change, the actual characters represented by the compression codes must also be changed. While the above described data compression systems may be very efficient in compressing data for transmission or storage, they suffer from several drawbacks. First, the compressed files are stored in a format which is not directly readable. That is, the files must be decompressed before being used for any purpose. This decompression of the information requires processor time so that the compressed information can be returned to its original form. Second, as the data is being compressed, a large amount of memory is often required to store frequently used character strings stored as codes in the compressed file.

Data compression routines are particularly useful for wordprocessing files. One way in which a data processing file can be stored is in a page description language which contains information of the text of the file and formatting commands. Page description languages (PDLs) are currently used to control the operation of computer printers and are ideally suited for printing documents containing both text and graphics. Examples of PDLs are Postscript® from Adobe Systems, Inc., and Interpress® from Xerox. The present invention is discussed with regard to the Standard Page Description Language (SPDL) which is currently a proposal in draft form before a section of the International Standards Organization ("ISO") as ISO/IEC DIS 10180 and is available through the American National Standards Institute ("ANSI") in New York.

A document in SPDL is a final form of the document. That is, the document has been created, edited, and all composition, formatting and positioning decisions pertaining to the document have been made. An SPDL document is ready for presentation by a presentation device such as a printer or computer monitor which displays the final form of the document. An SPDL document can also be transmitted to another computer.

There are two primary parts to an SPDL document; structure and content. The structure of a document is independent of its content. However, the structure of a document establishes the context of interpretation for the content. For example, if text is bold face, the context of interpretation would include the bold face font and the content would indicate that a bold face typeface should be used for the text and the text itself would also be in the content. Examples of structure elements are documents, pictures, dictionary generators and tokensequences, as set forth in co-pending U.S. patent application Ser. No. 07/876,601. A tokensequence is a special type of structure element which contains document content. SPDL uses Abstract Syntax Notation 1 (ASN.1) for binary structure encoding, as defined in ISO 8824:1990 and ISO 8825:1990, both of which are incorporated herein by reference, which defines tokensequences as Octet Strings which are a sequence of 8 bit bytes.

An SPDL document can be represented in two types of formats; a clear text format and a binary format. The clear text format represents a document using high level language programming commands similar to English, which can be understood by one familiar with the SPDL page description language. The binary SPDL format, on the other hand, represents a document using binary instructions and operands and is a machine language type of representation. While clear text SPDL files may be readable by both a human and a computer, clear text SPDL files require a large amount of physical storage space, are slow to be transmitted over communication lines, and require a large amount of processing time to print. However, a clear text SPDL file and a binary SPDL file are fully equivalent. That is to say any functionality that can be expressed in one can be expressed in the other with a syntactic transformation.

A conventional method of representing a binary floating point number is using the IEEE 754 Standard for Binary Floating-Point Arithmetic. There are two formats under the IEEE Standard; the single precision format which uses 4 bytes to represent a number, and the double precision format which uses 8 bytes to represent a number. For both formats, three fields are used to represent a number; a one bit sign field s, a biased exponent e, and a mantissa or fraction part f.

For the single precision representation of a number, the first bit in the binary representation is the sign bit s. The next 8 bits are for the exponent e, and the last 23 bits are for the fraction f, as illustrated in FIG. 1A. For the single precision format, a non-zero number X is represented in the IEEE standard by the following rule:

$$\text{If } 0<e<255, \text{ then } X=(-1)^s * 2^{e-127} * 1.f$$

Eight bytes are used to represent a number for the double precision IEEE 754 standard. The first bit in the binary representation is the sign bit s. The next 11 bits are for the biased exponent e, and the last 52 bits are for the mantissa or fraction part f, as illustrated in FIG. 1B. For the double precision format, a non-zero number X is represented in the IEEE standard using the following rule:

$$\text{If } 0<e<2047 \text{ then } X=(-1)^2 * 2^{e-1023} * 1.f$$

For both the single and double precision IEEE 754 standard, when the sign bit is 0, the number is positive and when the sign bit is 1, the number is negative. The biased exponent e is used for shifting the decimal point of the mantissa or fraction part f. A biased exponent is used so that the exponent can represent both positive and negative exponents. For instance, when 8 bits are used to represent the exponent e, there are 256 ($2^8$) different codes to represent both positive and negative exponents. An approximately equal range would be $-126 \leq \text{exponent} \leq +127$. The IEEE 754 standard has the smallest exponent (eight 0s) represent the smallest exponent (-126) and the largest exponent (eight 1s) represent the largest exponent (+127). Therefore, the exponent bias which must be added to the actual exponent for single precision numbers is +127 and for double precision numbers +1023. Consequently, if the exponent of a number has a value of 0, its representation should be 127 for the single precision representation and 1023 for the double precision representation.

While the IEEE 754 floating point standard can represent most floating point numbers, there are two problems with its representation. First, even using the double precision IEEE standard, precision of numbers can be lost when the number to be represented has more then 15 digits because the mantissa or fraction part is limited to 15 bits. For example, both 8388607.9660937499 and 8388607.996093501 are represented in the IEEE standard using double precision as 8388607.99609375. Second, the IEEE standard of representing a number requires 4 or 8 bytes, for single and double precision representations, respectively, and 4 or 8 bytes may be an unnecessary waste of memory in representing a number.

SUMMARY OF THE INVENTION

It is therefore an object of this invention to provide a representation of a clear text SPDL file which allows the file to be compressed into a binary form so that it may be stored using smaller space, and transmitted using less time, yet still be prepared for printing at a faster rate.

It is another object of this invention to represent numeric data in the compressed file with greater precision than conventional encoding techniques yet reduce the number of bytes required to represent the numeric data.

These and other objects of the invention are accomplished by a system and method which convert and compress a textual representation of a number to the binary $N/2^r$ format, when possible, as not every real number can be represented using the $N/2^r$ format. In the $N/2^r$ format, N is a binary number, either two or four bytes long, depending on whether a single or double precision representation is used, and r is a binary number of one byte for both the single and double precision representation. FIG. 2A illustrates the variables and variable lengths of the single precision $N/2^r$ format and FIG. 2B illustrates variables and variable lengths of the double precision $N/2^r$ format.

A first embodiment of a process of the invention determines if a number can be represented using the $N/2^r$ format by examining if the number to be compressed and converted is an integer. If it is an integer, the number can be represented using the $N/2^r$ format by setting N equal to the integer and r=0. If the number contains a decimal portion, the number is doubled and then checked to see if has become an integer. If it has not become an integer, it is repeatedly doubled until the number becomes an integer or N or r go out of predefined ranges.

A second embodiment of a process of the invention determines if the number to be converted and compressed is an integer in a manner similar to that of the first embodiment. If the number to be converted is not an integer, the decimal portion of the number to be converted and compressed is broken into groups having four consecutive digits. The right most group of four digits is examined to determine if it has characteristics allowing it to be compressed using the $N/2^r$ format. If the proper characteristics of the right most group of digits exists, the right most group of digits is multiplied by a power of two which results in a product having zeros in the one, tens, hundreds, and thousands positions. A carry from the right most group of four digits, corresponding to the ten thousands and hundred thousands digits of the product, is then added to the next right most group of four digits and this next most group of four digits is examined to see if it permits compression using the $N/2^r$ format. This examination of groups of four digits to the right of the decimal continues until there are no more groups of digits remaining or the number becomes an integer, and therefore can be compressed using the $N/2^r$ format.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1A illustrates the fields and field lengths of the single precision IEEE 754 floating point format;

FIG. 1B illustrates the fields and field lengths of the double 1 precision IEEE 754 floating point format;

FIG. 2A illustrates the fields and field lengths of the single precision $N/2^r$ format;

FIG. 2B illustrates the fields and field lengths of the double precision $N/2^r$ format;

FIG. 3A shows a textual representation of a floating point number;

FIG. 3B illustrates the ASCII representation of the number illustrated in FIG. 3A;

FIG. 3C shows the IEEE 754 single precision binary standard of representing the number illustrated in FIG. 3A;

FIG. 3D shows the $N/2^r$ single precision binary representation of the number illustrated in FIG. 3A;

DESCRIPTION OF THE PREFERRED EMBODIMENTS

Figure 4:
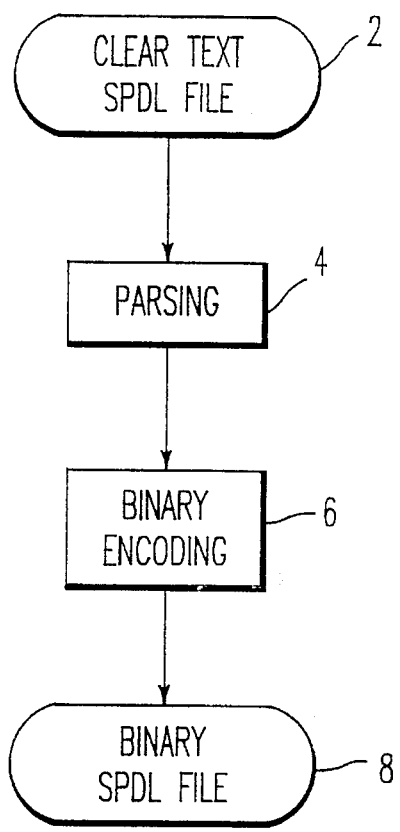
FIG. 4 is a simplified flowchart of a process for encoding a clear text SPDL file into a binary SPDL file.

Referring now to the drawings, wherein like reference numerals designate identical or corresponding parts throughout the several views, and more particularly to FIGS. 1A and 1B thereof, there are illustrated the fields used by the single and double precision IEEE 754 floating point standard for single and double precision representations respectively. As explained above, the single precision IEEE 754 floating point standard has one sign bit s, eight biased exponent bits e, and 23 bits for the mantissa or fraction part f. The double precision IEEE 754 floating point format has one bit for the sign field s, 11 bits for the biased exponent field e, and 52 bits for the mantissa or fraction part f.

FIGS. 2A and 2B illustrate the single and double precision $N/2^r$ format. For the single precision format, N is two bytes and for the double precision format, N is four bytes. For both the single and double precision formats, r is one byte. Therefore, the single precision $N/2^r$ format requires three bytes, as opposed to four bytes for the single precision IEEE 754 floating point format. The double precision $N/2^r$ format illustrated in FIG. 2B requires 32 bits for N and eight bits for r, and therefore requires a total of five bytes for representing a number, as compared to eight bytes for the double precision IEEE 754 floating point format.

FIG. 3A illustrates the textual representation of the number 567.125. Typically, the textual representation of this number would be stored in a computer using the American Standard Code for Information Interchange ("ASCII"). The ASCII representation of characters uses eight bits for each character which corresponds to two hexadecimal digits. The representation for 5 in ASCII hexadecimal is 35H, 6 is 36H, 7 is 37H, the decimal point is 2EH, 1 is 31H, 2 is 32H, and 5 is 35H, as illustrated in FIG. 3B.

FIG. 3C illustrates the single precision IEEE 754 floating point representation of the number 567.125 illustrated in FIG. 3A in hexadecimal. To encode this number into a single precision IEEE 754 floating point representation, 567.125 is encoded into a binary representation which is 1000110111.001. This number is equivalent $2^9+2^5+2^4+2^2+2^0+2^{-3}$. The number 1000110111.001 must be placed in fraction form which requires the decimal point to be shifted ten places to the left which results in the number 0.1000110111001. However, as the IEEE standard represents the number as 1·f, f is equal to 000110111001.

To obtain the biased exponent, 127 must be added to the exponent. As the decimal point must be shifted 9 places to the right of f and 1 placed in front of f to obtain the original number, 9 is added to the bias of 127, giving a biased exponent of 136. The binary representation of 136 is 10001000. As the number 567.125 is positive, the sign bit s is 0.

Therefore, the IEEE single precision representation of the number 567.125 is 0 for the sign bit, an 8 bit biased exponent of 10001000 and 23 bits for the mantissa or fraction part which is 0.00011011100100000000000. The hexadecimal equivalent of the IEEE 754 standard binary 01000100000001101110010000000000 is 44 0D C8 00 as illustrated in FIG. 3C.

The single precision $N/2^r$ representation of the number illustrated in FIG. 3A requires N to be 4537, and r to be 3. 4537 divided by 8 ($2^3$) is equal to 567.125. The binary representation of 4537 is 11 B9H and the hexadecimal representation of 3 is 3H. Accordingly, the $N/2^r$ representation of 567.125 is 03 B9 11H as illustrated in FIG. 3D.

Therefore, FIGS. 3A–3D clearly illustrate the advantage of the present invention of allowing a number to be represented using fewer bytes. The number 567.125 requires 7 bytes to be represented using ASCII as illustrated in FIG. 3B. The IEEE 754 standard single precision binary representation requires 4 bytes, as seen in FIG. 3C, whereas the single precision $N/2^r$ representation of 567.125 requires only 3 bytes, as illustrated in FIGS. 3D.

Turning now to FIG. 4, a simple binary encoding process is illustrated in which a clear text SPDL file 2 is converted to a binary SPDL file 8. The clear text SPDL file 2 is typically generated by a word processor, page description generator or graphics program, for example. Encoding a clear text SPDL file to a binary form compresses the file to about 30% of its original size which reduces the space necessary to store the file by about 30%. The time necessary to transmit the file over communication lines to a printer or a network is similarly reduced by approximately 30%. Additionally, a binary SPDL file can be processed for printing or displaying much faster than a clear text SPDL file. The binary SPDL file is printed faster because, for example, the clear text commands have been converted into the equivalent of a binary opcode which can be processed much faster clear text commands. Also, there is no need to examine the binary SPDL file for end of procedure commands as the lengths of procedures are encoded at the beginning of each procedure. The conversion to the $N/2^r$ format of the present invention also allows numeric data to be represented using a smaller number of bytes than the IEEE 754 standard which allows binary SPDL files to be stored using a smaller storage space and transmitted using less time as compared to the IEEE 754 standard.

While the processes and examples described herein will describe a conversion of textual representation to a binary representation, an important feature of the invention is the physical transformation performed by this invention. The physical representation of clear text data in a memory is larger than the physical representation of the equivalent information in binary form. When data is represented in a memory such as a disk, it is stored as magnetic aberrations of zeros and ones on the disk. Therefore, the converted representation of the file requires less magnetic material on the disk to represent the same information. Alternatively, if the data is stored in a RAM, it is stored not magnetically but electrically. Therefore, the binary representation requires less electrical signals which are stored in fewer memory locations.

The first processing step illustrated in FIG. 4 is the parsing step 4. The parsing step separates the components of the clear text SPDL file into basic units such as structure elements or content which can then be translated into machine instructions by a binary encoding step 6. Conventional types of parsing are easily implemented, either in software or in hardware, and no explicit details of the parsing are made for the sake of brevity.

Next, the parsed basic units from step 4 are encoded into a binary format in step 6 and stored in binary SPDL file 8. The process of the binary encoding is the step which the present invention is directed toward and a detailed description of the binary encoding process will be described after a description of the hardware used to implement the present invention.

Figure 5:
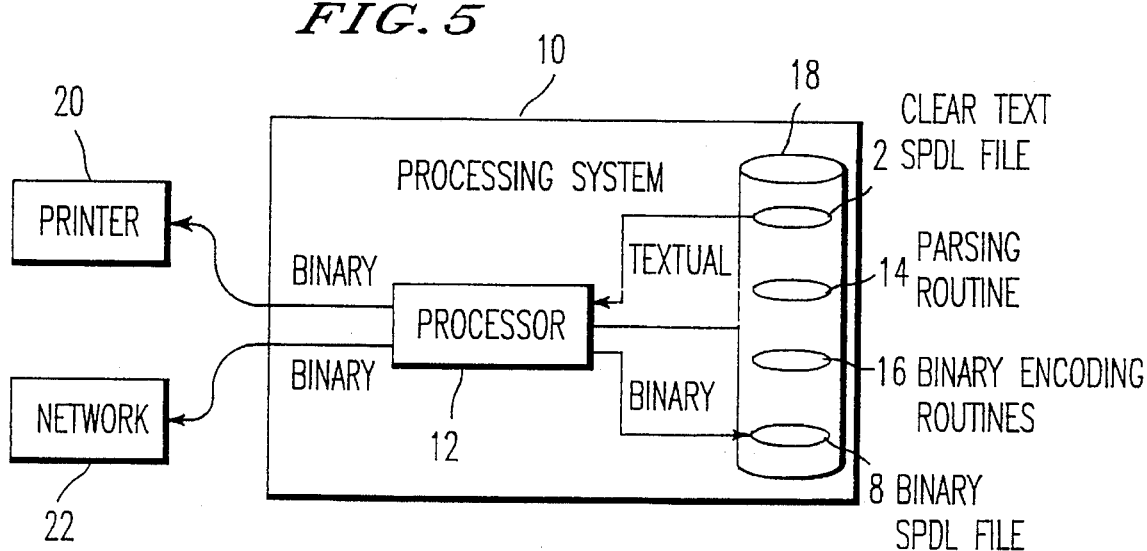
FIG. 5 is a block diagram of a system implementing the present invention.

FIG. 5 illustrates a block diagram of an apparatus constructed in accordance with the invention. The clear text SPDL file 2 from a storage device 18, such as a hard disk, is transmitted to a processor 12 in a processing system 10. SPDL files are one type of page description files. A page description file is any file encoded in a page description language. Processor 12 uses a parsing routine 14 and binary encoding routines 16 to perform the parsing step 4 and binary encoding step 6 of the process illustrated in FIG. 4. The binary SPDL file 8 can be transmitted back to storage device 18 for archive purposes as a binary SPDL file 8, to a printer 20, or to other devices in a network 22.

Figure 6:
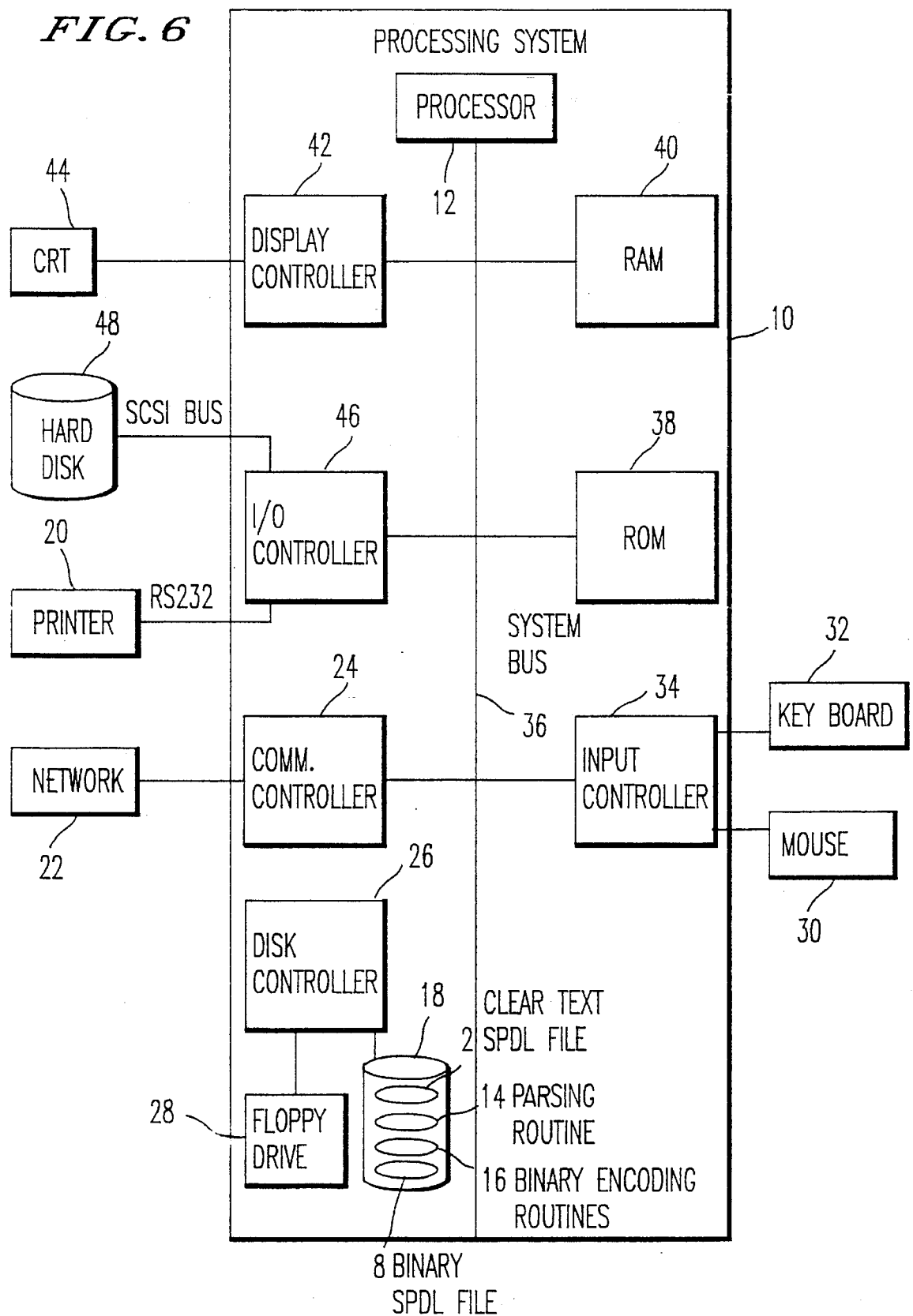
FIG. 6 is a more detailed illustration of FIG. 5.

FIG. 6 is a more detailed diagram of the processing system 10 of FIG. 5 and the peripherals connected thereto. Storage device 18 stores the clear text SPDL file 2 which is transmitted to a RAM 40 using a disk controller 26 and a system bus 36. Processor 12 is used to parse and encode, using the parsing routine 14 and binary encoding routines 16, the clear text SPDL file which is stored in RAM 40. From RAM 40, the encoded binary file can be stored or archived in storage device 18 which is for example, a hard disk, as the binary SPDL file 18, in a floppy drive 28 connected to a disk controller 26 or in a second hard disk 48 connected to an I/O controller 46 through an SCSI bus. Alternatively, the file could be printed using printer 20 connected to an I/O controller 46 using, for example, an RS232 line, or sent over a network 22 such as a conventional Ethernet® network using a communication controller 24. Information is displayed on a CRT 44 which is sent from a display controller 42. The processing system 10 is controlled by a user through a keyboard 32 or a mouse 30, both of which may be connected to an input controller 34. A ROM 38 is used to store various routines required by processor 12.

Figure 7:
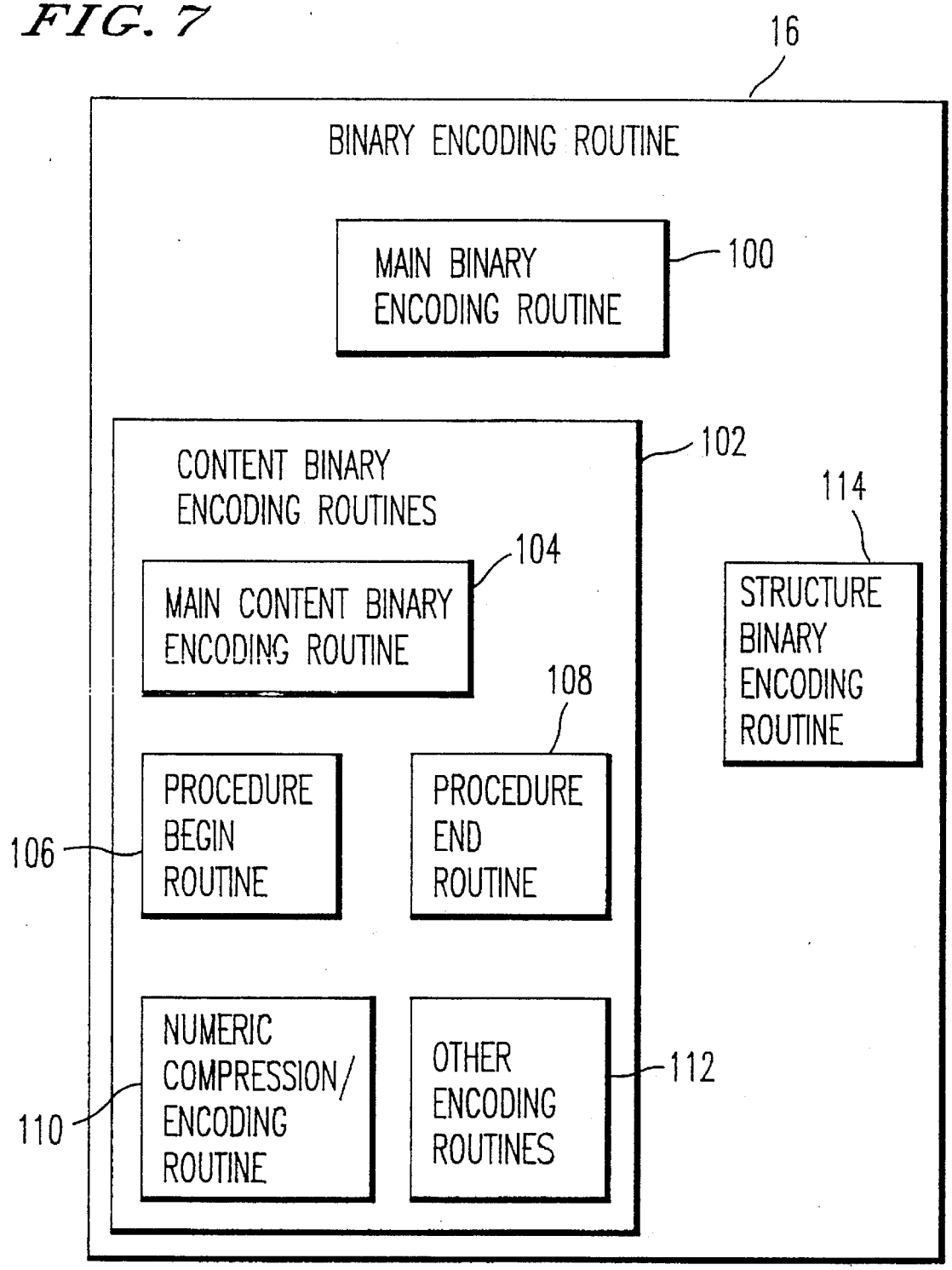
FIG. 7 is a block diagram of the binary encoding routines used by the invention.

FIG. 7 illustrates the various routines of binary encoding routine 16. When encoding of a clear text SPDL file begins, a main binary encoding routine 100 is executed. The main binary encoding routine 100 determines whether content or structure is being encoded and calls either the main content binary encoding routines 104 or structure binary encoding routines 114. The structure binary encoding routines 114 determine the type of structure which is to be encoded in binary format so that a proper context of interpretation of content can be performed. Examples of various structures used in SPDL language are pictures, pagesets, prologues, and dictionary generators. The structure defines various components such as state variables and dictionaries used when interpreting content. A more complete description of the various types of structures is not necessary for an understanding of the present invention but can be found in commonly assigned co-pending U.S. patent applications Ser. No. 07/778,578, filed on Oct. 17, 1991, Ser. No. 07/876,251, filed on Apr. 30, 1992, Ser. No. 07/876,601, filed on Apr. 30, 1992, and Ser. No. 07/931,808, filed on Aug. 11, 1992.

Once the structure is determined by structure binary encoding routines 114, content binary encoding routines 102 can translate the clear text representation of various tokens from a textual format to a binary format. A main content binary encoding routine 104 determines the type of content to be encoded. If there is a beginning or an end of a routine, main content binary encoding routine 104 calls procedure begin routine 106 or a procedure end routine 108 respectively. When encoding the numeric content into binary form, the main content binary encoding routine 104 calls the numeric compression/encoding routine 110 when numeric data is encountered in the clear text SPDL file, and calls other encoding routines 112 when nonnumeric encoding is required. Numeric compression/encoding routine 110 is the process which the present invention is directed towards.

The routines of FIG. 7 have been separately illustrated for simplicity. However, it is possible to combine two or more routines into one routine. For example, it is possible to have the main binary encoding routine 100 and structure binary encoding routines 114 as one routine. It is also possible to have the parsing function performed by the main binary encoding routine 100 or structure encoding routine 114. While a simplified embodiment of the invention has all binary encoding routines performed by processor 12, it is possible to have a separate structure processor for structure binary encoding routines 114 and a separate content processor for content binary encoding routines 102 to increase execution speed.

Figure 8:
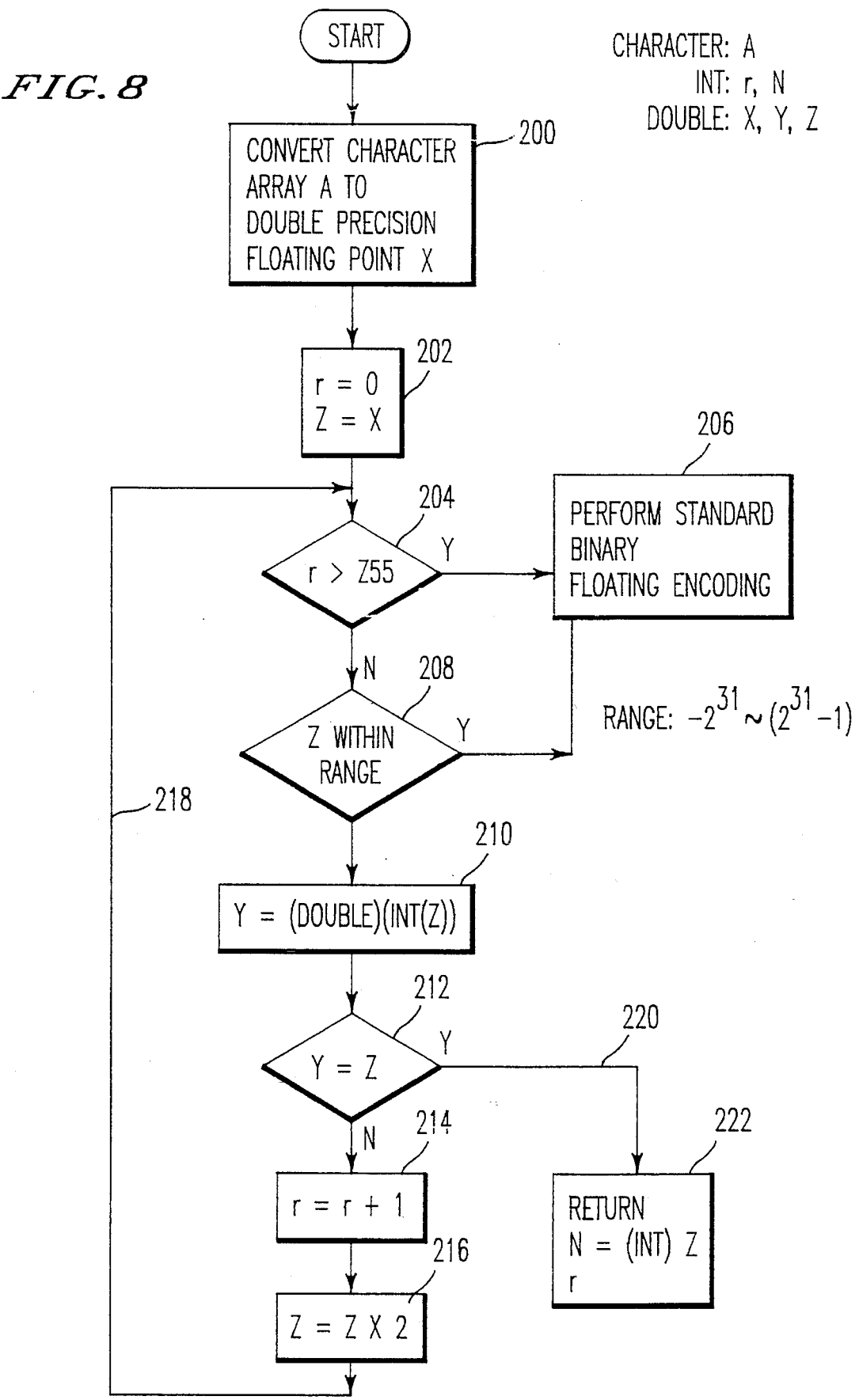
FIG. 8 is a flowchart of a process used to compress and encode data according to the first embodiment of the invention.

Referring now to FIG. 8, there is illustrated a process stored in storage device 6 as numeric compression/encoding routine 110 which is part of binary encoding routines 16, for compressing and encoding data into the $N/2^r$ format according to a first embodiment of the invention. Not all data can be represented using the $N/2^r$ binary format and some data must be encoded using a different type of binary representation such as the IEEE 754 standard because the $N/2^r$ format requires the number being compressed to be expressed as an integer divided by a power of two.

Limitations of the system performing the $N/2^r$ compression are that N is represented by a maximum of four bytes for the double precision representation, which therefore requires N to be in the range $-2^{31}$ to $2^{31}-1$, and r has as a maximum value of 255 which requires 1 byte for storage. Alternatively, N is represented by two bytes in the single precision representation. Note that the $N/2^r$ format does not itself limit the ranges of N and r. However, the present inventor has found that the ranges of $0 \leq r \leq 255$ and $-2^{31} \leq N \leq 2^{31}-1$ are adequate to represent a double precision number. For a single precision number, N can be represented using 2 bytes instead of 4 bytes which limits the range of N to be $-2^{15} \leq N \leq 2^{15}-1$.

The process of the first embodiment operates by determining if the number to be converted is an integer and if it is not, systematically doubling the number to see if an integer results from the doubling. If the number to be converted, X, is an integer, that number can be represented using the $N/2^r$ format by setting N=X and dividing N by 1 ($2^0$). If X is not an integer but a floating point decimal, X may not be able to be represented by an integer divided by a power of 2. In an attempt to represent the non-integer X using the $N/2^r$ format, X is multiplied by 2 in an attempt to eliminate the decimal portion. If the number X is doubled and an integer does not result, X is again doubled and again examined to see if an integer has resulted. If not, the system continues doubling the number until an integer results or the values r or X are out of range.

Every time X is doubled (multiplied by 2), the value r, representing the power of 2 by which N is divided, must be increased by 1. This division by powers of 2 in the denominator is necessary to properly represent the number because the numerator has been doubled. In effect, each loop of the flow chart multiplies X by 2 in an attempt to obtain an integer in the numerator.

Examining the operation of the process illustrated by the flowchart of FIG. 8, a main process, such as main content binary encoding routine 104, encounters a number and places a textual representation of the number in a character array A and calls the numeric encoding/compression routine 110 illustrated in FIG. 8. The process of FIG. 8 uses A as a character array, r and N as integers, and X, Y, and Z as double precision numbers. Step 200 of FIG. 8 converts character array A to a double precision floating point number X. Step 202 then initializes the values r=0 and Z= X. Next, the ranges of r and Z are examined to see if they are in the range $r \leq 255$ and $-2^{31} \leq Z \leq 2^{31}-1$ in steps 204 and 208. If these numbers are out of range, standard binary floating encoding, such as the IEEE 754 standard, is performed by step 206 and the process of FIG. 8 is terminated. If r and Z are in range, step 210 sets the variable Y equal to the double precision integer value of Z. If Y is equal to Z, Z is an integer and therefore, X can be represented using the $N/2^r$ format and the process proceeds along line 220 to step 222 where N and r are returned to the main routine which called the process of FIG. 8. If Y is not equal to Z at step 212, r is incremented by 1 in step 214 and the value of Z is doubled in step 216, in effect, multiplying X by 2. The flow loops back to block 204 along line 218 where the process repeats until r or Z is out of range, or it is determined that the number of character array A can be represented using the $N/2^r$ format because Z has become an integer. If it is impossible to compress a floating point number using the $N/2^r$ format, the number Z will be doubled until Z or r are out of their respective ranges. This method will work regardless of the floating format used by the host CPU.

The second embodiment of a process of the invention is illustrated in the flowcharts of FIGS. 9A–11 and determines if a number can be compressed using the $N/2^r$ format by examining the digits to the right of the decimal point. The present inventor has found that if there is one digit to the right of the decimal point, the number can be compressed using the $N/2^r$ format only if that digit is 5 (e.g., the number ends with 0.5). This is because 0.5 is the only single digit decimal which will become an integer by a single or successive multiplications by 2.

If the number has a two-digit decimal, only numbers ending in 0.25 and 0.75 can be compressed using the $N/2^r$ format as these are the only two-digit decimals which become integers upon successive multiplications by two. By multiplying the two-digit decimal by 4 ($2^2$), if the two-digit decimal does not become an integer, the decimal cannot be converted to the $N/2^r$ format.

In a similar manner, the only three-digit decimals which can be converted to the $N/2^r$ format are 0.125, 0.375, 0.625 and 0.875. If a number ending in one of these three digit decimals is multiplied by 8 ($2^3$), the decimal will become an integer. If the number ends in a three-digit decimal which is not 0.125, 0.375, 0..625, or 0.875, if the number is multiplied by 8, it will not become an integer, and therefore, the number cannot be represented using the N/$2^r$ format. Similarly, the only four-digit decimals which can be encoded using the N/$2^r$ format are 0.0625, 0.1875, 0.3125, 0.4375, 0.5625, 0.6875, 0.8125, and 0.9375. If any of these four-digit decimals are multiplied by 16 ($2^4$), the result will be an integer as the decimal portion will have been eliminated.

In the preceding list of enumerated decimals for which the compression of the present invention will work, trailing zeros of the decimals are ignored. Therefore, for example, the decimal 0.50 or 0.500 are considered 0.5 and likewise, 0.250 and 0.2500 are considered to be 0.25. The trailing zero(s) are ignored because multiplication of a trailing zero in a decimal is always zero.

If the number of digits to the right of the decimal point is greater than four, the digits are broken up into groups of four with the right most group of four digits having 1–4 non-zero digits, depending on the number of digits to the right of the decimal. For example, if the decimal is 0.96875, 9687 is the first group of four digits, and 5000 is the second group. If the right most group has less than 4 digits, it is examined first as follows. To determine if a number having more than four digits to the right of the decimal point can be compressed using the second embodiment of the invention, the right most group of digits is first examined to determine if multiplication by 2 to the power of the number of digits (<4) of that group will result in the right most group of digits having 0 in the ones, tens, hundreds and thousands position. If there are zeros in the ones, tens, hundreds and thousands positions, the second right most group of digits, if it exists, is multiplied by the same power of 2 which results in the right most group of digits to have the ones, tens, hundreds and thousands positions as zeros. Additionally, the carry from the right most group of digits, defined as the integer portion of the group of four digits multiplied by the power of 2 and divided by 10,000, is added to the second right most group after multiplication by the same power of 2. Then, after all groups of four digits to the right of the decimal are processed in a similar manner, the integer portion is multiplied by the same power of 2 and has the carry from the group of digits immediately to the right of the decimal added thereto.

Now, all groups have four digits and the right most group has been processed so the second right most is now the right most group. The right most group of four digits is examined to see if it is 0625, 1875, 3125, 4375, 5625, 6875, 8125, or 9375. If the right most group is not equal to one of these numbers, the number to be compressed cannot be represented in the N/$2^r$ format and therefore standard floating point encoding must be used. If the number to be compressed is in one of these formats, the right most group of digits is multiplied by 16. The resulting number will have zeros in the ones, tens, hundreds, and thousands positions with the carry value corresponding to the ten thousands (and hundred thousands) position(s). Next, the remaining groups of four digits are multiplied by 16 and have the carry from the group of four digits to its right added thereto. Finally, the integer portion of the number is multiplied by 16 and has the carry portion from the group of four digits immediately to the right of the decimal added thereto.

Turning now to the flow charts of the second embodiment process illustrated in FIGS. 9A–11, a detailed description of the compression process will now be presented. The process of FIGS. 9A–11 is called in a similar manner as the process of the first embodiment of FIG. 8. A main process such as main content binary encoding routine 104 of FIG. 7 encounters a textual representation of a number, places the number in character array A, and calls the numeric compression/encoding routine 110 as illustrated in FIGS. 9A–11.

Figure 9A:
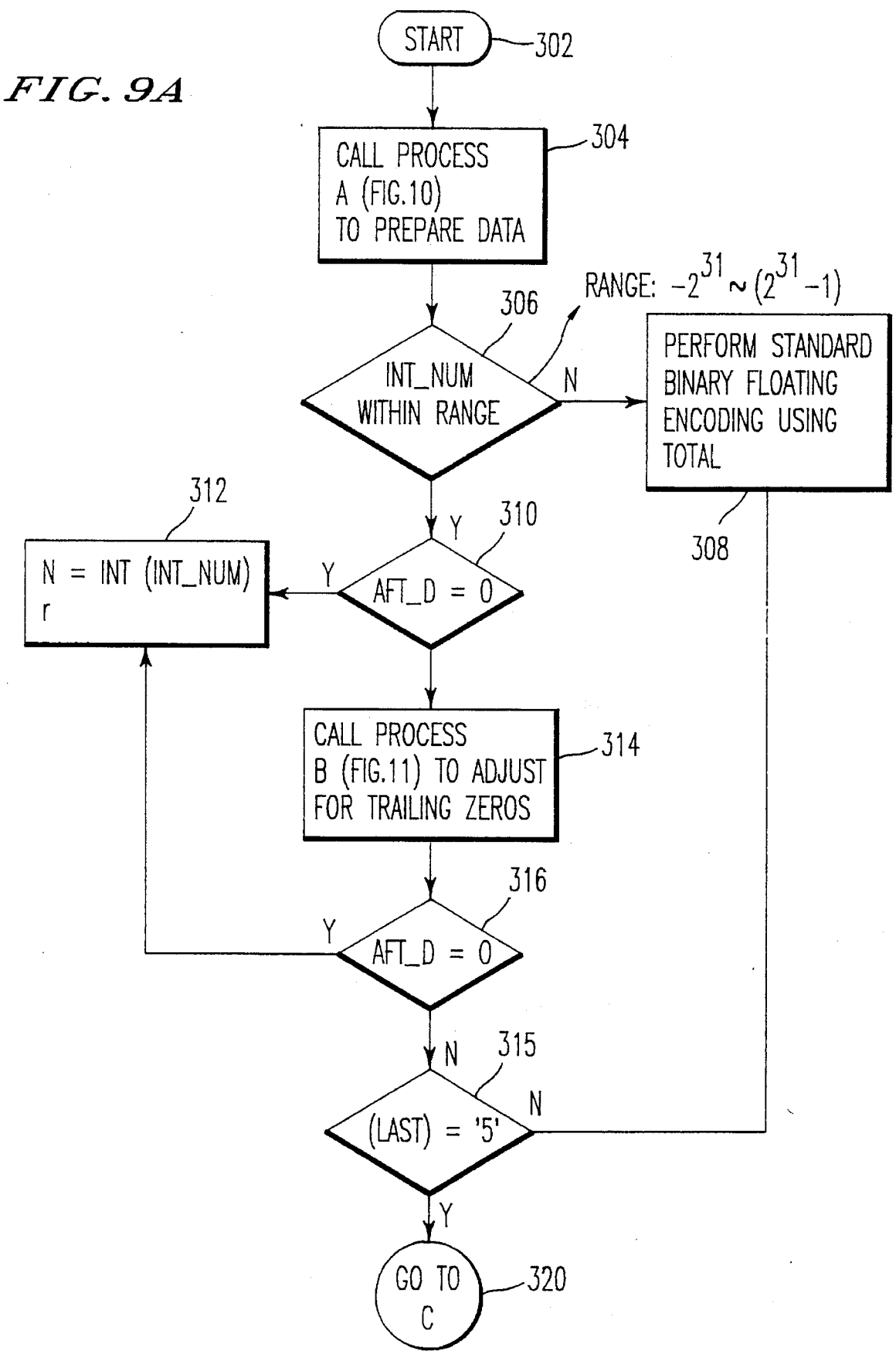
FIGS. 9B(1), 9B(2) and 9C are flowcharts of a process used to compress and encode data according to the second embodiment of the invention.
Figure 10:
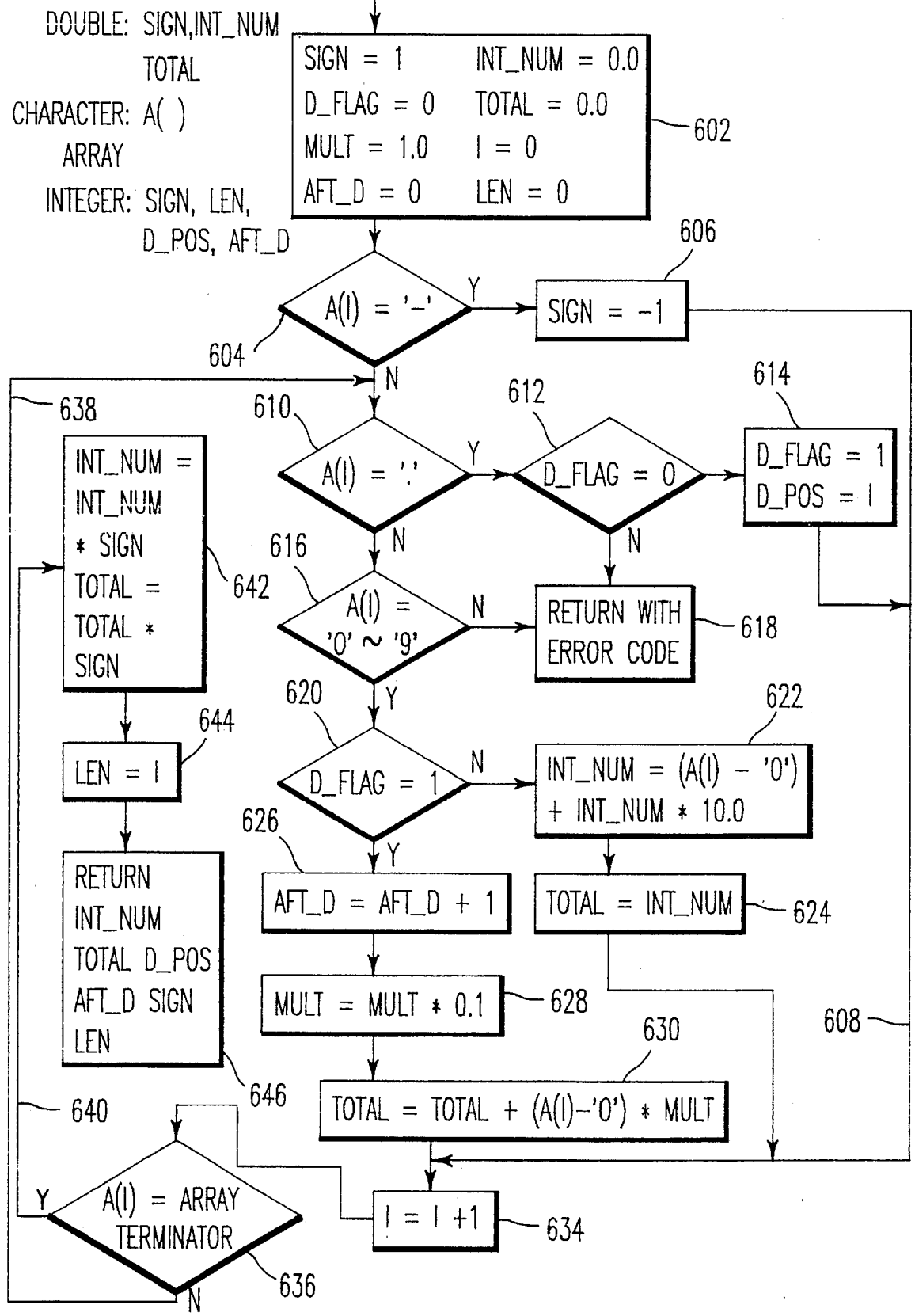
FIG. 10 is a flowchart of a process used to prepare data for the second embodiment of the invention.

The first step performed by FIG. 9A is to initialize and define variables in step 304 by calling the data preparation process of FIG. 10. The process of FIG. 10 uses the character array A which holds the textual representation of the number to be compressed and encoded and defines the values of variables which describe the characteristics of character array A. The variables used by the process of FIG. 10 are double precision floating point variables MULT, INT_NUM, and TOTAL, character array A, and integers SIGN, LEN, D_POS and AFT_D.

Examining the details of FIG. 10, step 602 initializes the variables. In step 604, the index i of the array is 0 and the first character in the array is examined to determine if it is a minus sign. If it is a minus sign, SIGN is set equal to −1 in step 606 and flow proceeds along line 608 to step 634 where i is incremented by one. In step 636, an array terminator will not exist because only the first character, a minus sign, has been examined and flow will proceed along line 638 to step 610.

Step 610 determines if the current character being examined is a decimal point. If it is a decimal point, error checking is performed in step 612 by determining if the variable D_FLAG is 0. D_FLAG is 0 when characters to the left of the decimal point are being processed and is 1 when digits to the right of the decimal point are being processed. If the current character being processed is a decimal point and D_FLAG is not 0, there is an error as a second decimal point in the character string has been encountered. If there is no error, D_FLAG is set equal to 1 and D_POSITION is set to the array index i in step 614.

Step 616 determines whether the character of the array is a digit. If it is not a digit, there is an error. If there is a digit, step 620 determines if digits to the left or to the right of the decimal point are being processed. If digits to the left of the decimal point are being processed, steps 622 and 624 set the variables INT_NUM and TOTAL to the appropriate values. If digits are being processed to the right of the decimal point, steps 626, 628 and 630 increment the counter which indicates the number of digits after the decimal point and adds the appropriate decimal value to the variable total. The index i is incremented by 1 in step 634 and flow loops again along line 638 to step 610 unless step 636 determines that the end of the array has been reached by examining if A(i) is an array terminator.

After the loop is exited at step 636, if the character array begins with a minus sign, the variables INT_NUM and TOTAL are changed to negative numbers in step 642. Step 644 sets LEN, the length of the character array A equal to i. Step 646 then returns the enumerated variables to the process of FIG. 9A where the flow proceeds to step 306.

Step 306 determines whether the integer portion of array A has a value which permits compression according to the N/$2^r$ method (i.e., $-2^{31} \leq$ INT_NUM $\leq 2^{31}-1$). If the number to be compressed is out of this range, standard floating encoding of the number must be performed. If the number is in this range, the number of characters after the decimal point is checked in step 310. If there are no digits after the decimal point, the number to be compressed is an integer and flow proceeds to step 312 where N and r values are set. When the value is an integer, the binary encoding routine will use integer encodings. If there are digits after the decimal point, flow proceeds to step 314 where the decimal portion of the number to be compressed and encoded has trailing zeros removed, if they exist, by calling the process B illustrated in the flowchart of FIG. 11.

Figure 11:
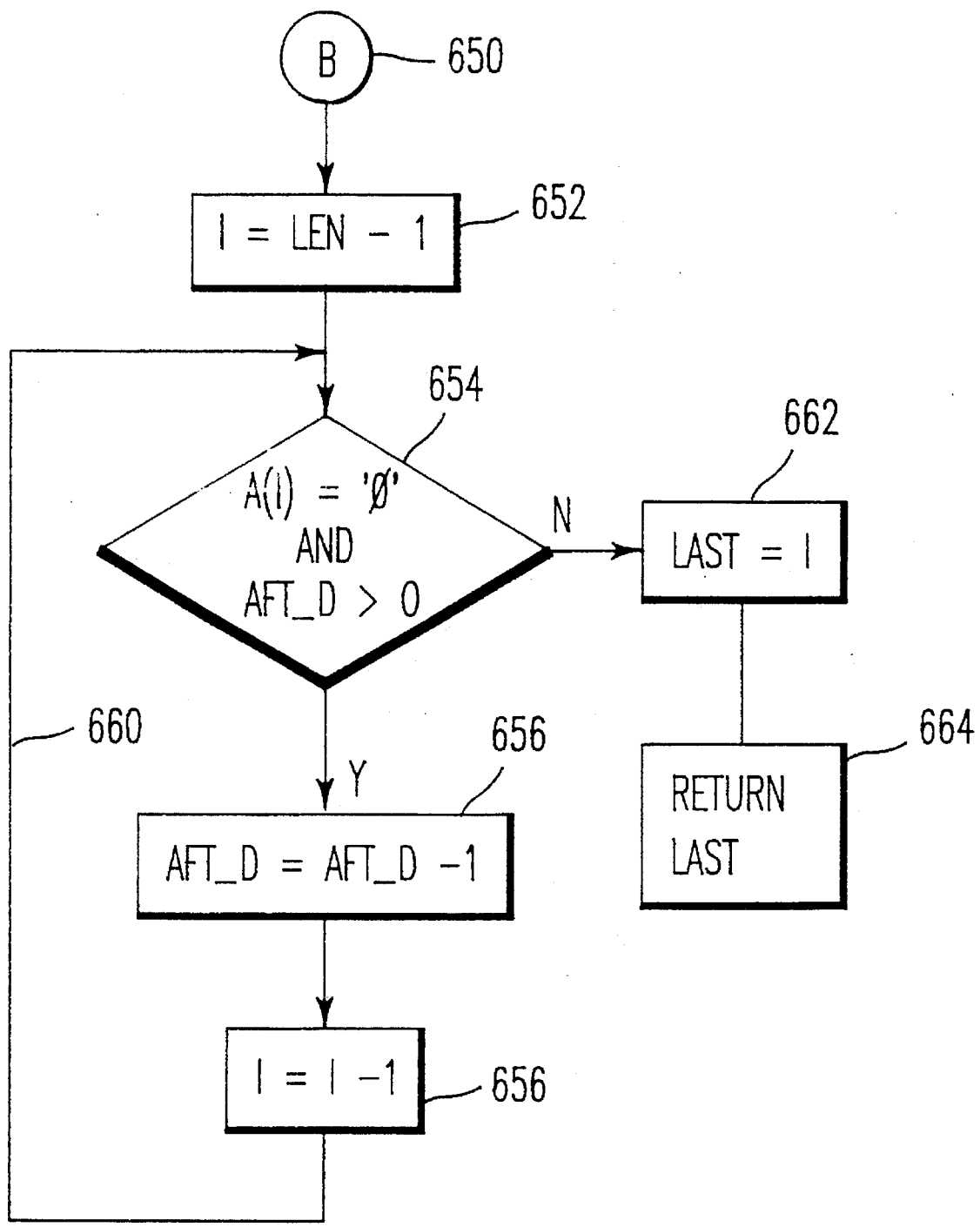
FIG. 11 is a flowchart of a process used to find the last non-zero digit after a decimal point for the second embodiment of the invention.

In FIG. 11, step 652 sets index i to correspond to the last character in the array. The variable LEN is decremented by 1 to obtain index i for the last character of the array because the characters in the array have the index of the first character as 0 and not 1. In step 654, the right most character of array A is checked to see if it is 0 and if the right most character is to the right of the decimal point. If both conditions in step 654 are true, the last digit to the right of the decimal point is therefore ignored. The variable AFT_D is decremented in step 656, indicating that the number of digits after the decimal point is one less than previously calculated and i is decremented by 1 in step 658. Flow returns along line 660 to step 654 where again, the value of the right most digit to the right of the decimal point is checked to see if it is equal to 0. This looping continues until there is a non-zero right most digit to the right of the decimal point, or all digits to the right of the decimal point have been checked. Then, LAST, the position of the right most non-zero decimal digit, is set equal to i in step 662, and flow returns to step 316 of FIG. 9A from step 664.

After the trailing zeros have been adjusted, if there are no digits after the decimal point in step 316, the input array is an integer and the N and r values are set in step 312. Otherwise, the last digit to the right of the decimal point is checked to see if it is equal to 5 in step 318. If the last decimal digit is 5, it might be possible to encode the number using the $N/2^r$ format, although further checking is required. If the last decimal digit is not 5, it is impossible to encode the number using the $N/2^r$ format and standard floating point encoding is performed in step 308.

From step 320 of FIG. 9A, flow proceeds to process C illustrated in FIGS. 9B(1) and 9B(2). The process of FIGS. 9B(1) and 9B(2) is a continuation of the process of FIG. 9A and therefore uses the same variables as FIG. 9A. Additionally, FIGS. 9B(1) and 9B(2) use the integer variables GC, LN, i, j, k, END, r, and N, the integer arrays NN and CN, and the double precision floating point variable X. Step 332 sets where the integer variable GC is set to the number of groups of four digits after the decimal point. If the number of digits after the decimal point is not divisible by 4, the last group of less than four digits is still considered a group of 4. For example, if there are five digits to the right of the decimal point, GC is set equal to 2. Because GC is defined as an integer, the decimal portion is ignored. Next, the number of non-zero digits in the right most group of four digits is determined in step 234 by taking the modulus, base 4, of AFT_D, the integer remainder of AFT_D divided by 4. Step 334 determines if the number of digits to the right of the decimal point is evenly divisible by 4 and if the number of digits is not evenly divisible by 4, step 338 inserts zeros at the end of the array such that the number of digits to the right of the decimal point is evenly divisible by four. For example, if the decimal portion of A is 0.96875, the decimal portion of A would be changed to 0.96875000. The variable X is initialized as INT_NUM the integer part of the number to be converted in step 340 and the counter i is initialized as 0 in step 342.

Steps 344 to 362 set the integer array NN to four-digit integer numbers corresponding to the four-digit groups to the right of the decimal place. Also, the integer array for carries, CN, is initialized to be 0. For example, if the decimal is 0.96875, NN(0) is 9687 and NN(1) is 5000, and CN(0) and CN(1) are both zero.

Examining the details of steps 344 to 362, the first time step 344 is reached, GC is always greater than 0 and therefore flow proceeds to step 346 where NN(i) and CN(i) are initialized as 0. Then, the counter j is set equal to 1 in step 348. The counter j is used to count through the digit position in each group of four digits. Therefore, j must be 1, 2, 3, or 4. The first time through the loop of steps 350, 356, 358 and 360, j=1 and flow proceeds from step 350 to step 356. Step 356 defines the index k, corresponding to the digit being processed, to be the position of the decimal, plus the counter j added to 4 times the counter i. NN(i) is then set to be 10 times the old value of NN(i) plus the numeric value of the character digit in the array A in steps 358. The variable j is then incremented by 1 in step 360 and flow proceeds back to step 350 along line 362 and the loop of steps 350, 356, 358, and 360 is processed a total of 4 times until the four digits of a group are processed, thereby defining NN(i) to have a numeric value corresponding to the digits in the group of four characters from array A. Step 352 increments the counter i by 1 so that the next most significant group of four digits can be initialized and flow loops back to step 344 along line 354. Once all groups of four digits to the right of the decimal are processed, i will equal GC and flow will then proceed from step 344 to step 366 along line 364.

The array CN having an index which is the number of groups of four to the right of the decimal point is initialized in step 366. Step 368 defines END to be one less than the number of groups of four digits after the decimal point as the first group of digits to the right of the decimal point has an index of zero; e.g., NN(0) is to the right of decimal point. Step 370 initializes r, the power to which 2 is raised in the $N/2^r$ format, as LN, the number of digits in the right most group of digits to the right of the decimal point.

Step 372 determines whether or not the right most group of four digits has trailing zeros. If there are no trailing zeros, flow proceeds to the process of the flow chart illustrated in FIG. 9C by calling process D in step 374. If there are trailing zeros, additional processing must be performed in steps 378–410.

Step 376 sets index i to END, corresponding to the right most group of digits. Flow then proceeds to FIG. 9D(2). The loop of steps 378–398 is entered and will be executed the number of times there are groups of four digits if the right most group of digits can be compressed using the $N/2^r$ format. Step 380, the first time through the loop, multiplies the right most group of four digits, NN(END) by 2 raised to the power LN. This step has the effect of multiplying NN(END) by 2 ($2^1$) if there is one non-zero digit in the group, multiplying NN(END) by 4 ($2^2$) if there are two non-zero digits in the right most group of digits, and multiplying NN(END) by 8 ($2^3$) is there are three non-zero digits in the right most group of digits. There will not be 4 non-zero digits in the right most group of digits as process D of FIG. 9C would have been called at step 374. Note that the carry term CN(i+1) of step 380 will always be zero the first time through the loop as there is no carry for the right most group of digits. Step 382 assigns the carry value which will be added to the next left group of digits as the integer portion of NN(i)/10,000. This step has the effect of shifting the decimal point of NN(i) four digits to the left and calling the integer portion the carry. The carry value, multiplied by 10,000, is then subtracted from NN(END) in step 384. This step has the effect of eliminating the digits in the 10,000's place and greater of the value of NN(i). If the digits in the right most group of four, when multiplied by $2^{LN}$ in step 380, result in a number that has the right four digits as zeros, will be zero NN(i) in step 384. In step 386, the carry value of i+1 is set to 0 as this carry value has been accounted for.

The first time loop 378–400 is executed, i equals END at step 388 and flow proceeds along line 390 to step 392 which determines if NN(END) equals 0. If it is zero, step 380 successfully removed the non-zero digits from the ones, tens, hundreds, and thousandths position of NN(END) and therefore the right most group of four digits does not prohibit the original number from being compressed and encoded using the N/2$^r$ representation. If NN(i) is not equal to zero in step 392, it is impossible to use the N/2$^r$ format and an alternative method of floating encoding must be performed in step 294. If it is determined that the right most group of four digits, NN(END), is in proper format for N/2$^r$ encoding, step 298 decrements index i in step 398 and flow returns to the top of the loop at step 378.

In the above described loop of 378 to 400, step 392 performs a simple check to determine whether the right most group of digits prohibits the number from being compressed and encoded using the N/2$^r$ format. However, an alternate method of the determination in step 392 could be performed by checking to see if the last character in the array is 5 when LN is 1, checking to see if the last two digits of the array are 25 or 75 when LN is equal to 2, or checking to see if the last three digits of the array are 125, 375, 625 or 875 when LN is equal to 3. These enumerated digits are the only ones which permit compression using the N/2$^r$ format.

When step 378 is executed the second time, if there was only one group of four digits to the right of the decimal point, i will be a negative value and flow will proceed from step 378 to 404 along line 402. Alternatively, if there was more than one group of four digits to the right of the decimal point and the right most group of digits after being processed in steps 380–384 were determined to be zero in step 392, the loop of step 378–400 is executed for each remaining group of four digits. The purpose of performing the arithmetic operations on each remaining group of four digits is not to eliminate the group of four digits as it was the first time through the loop, but is to multiply the remaining groups of four digits was originally multiplied by and adding the carry produced by the previous time through the loop.

After each group of four digits to the right of the decimal point has been examined, i equals −1 and flow proceeds from step 378 along line 402 to step 404 where END is decremented by 1. This is because the right most group of four digits has been set equal to zero and now the second right most group of four digits is at the end of the array. Step 406 takes the old integer value of X, multiplies it by 2 raised to the power which the digits to the right of the decimal have been raised, and adds the final carry determined in step 382 multiplied by the sign of the original number to be compressed. Because step 406 takes into account the carry from multiplying the decimal portion by 2$^{LN}$, the carry value is reset to zero in step 408 and the flow then proceeds at step 410 to process D of FIG. 9C.

Figure 9C:
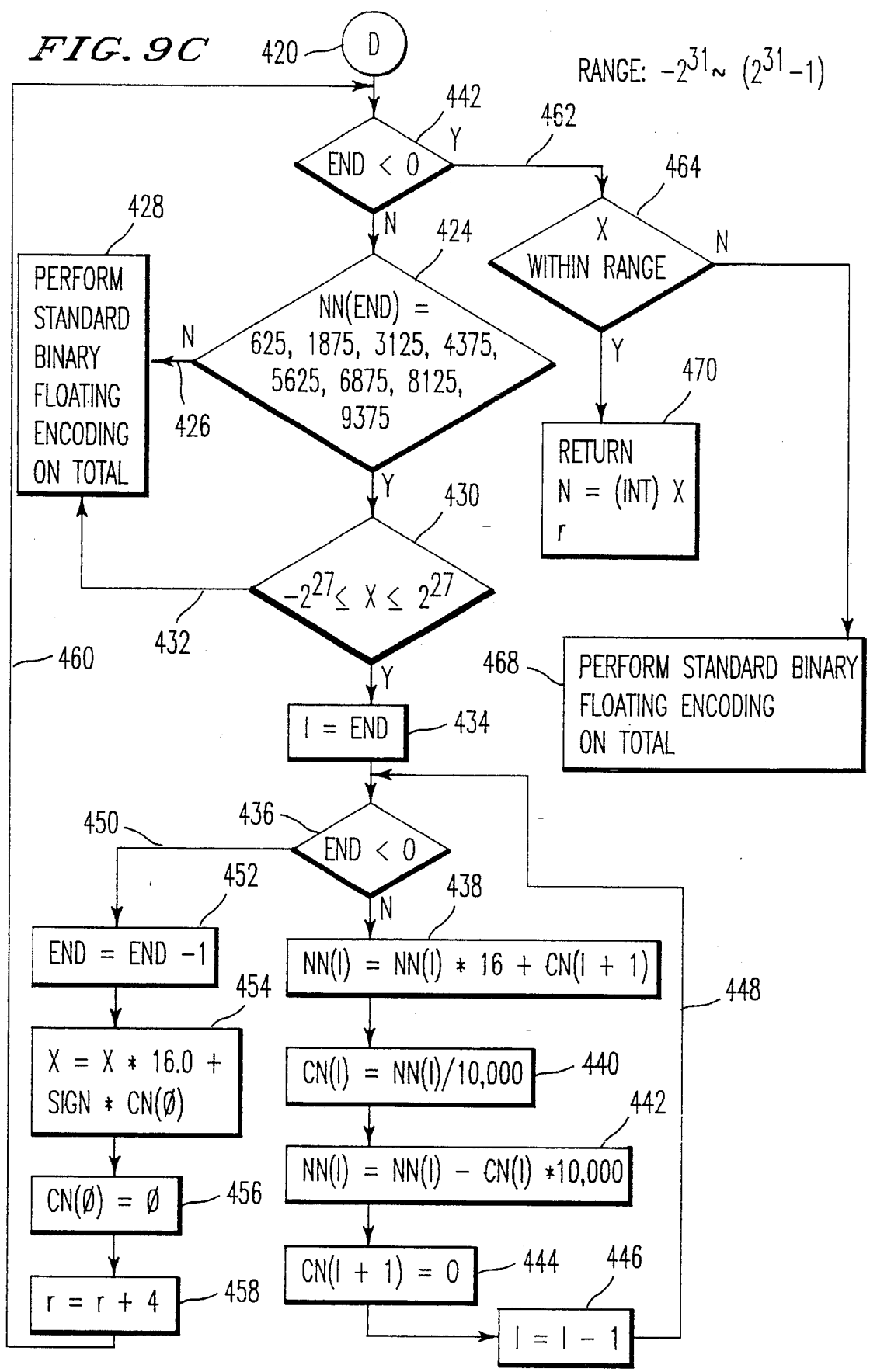

From either step 374 or step 410 of FIGS. 9B(1) and 9B(2) respectively, process D of FIG. 9C is executed. In step 422 of FIG. 9C, END will be less than zero only when all groups of four digits to the right of the decimal point have been eliminated and the remaining number is an integer. If there are groups of four digits to the right of the decimal point remaining, step 424 examines the right most group of four digits to determine if it is in the enumerated groups. If it is not, the number cannot be converted to the N/2$^r$ format and flow proceeds along line 426 to step 428 where standard format and flow proceeds along line 426 to step 428 where standard binary floating encoding is performed. If the right most group of four digits is in the enumerated group, step 430 determines if X will ultimately be in the range of $-2^{31} \leq X \leq 2^{31}-1$. Note that the flow chart uses the value $2^{27}$ as the range because proceeding through the loop will cause the value of X to be multiplied by 16 ($2^4$) in step 454 which will increase $2^{27}$ to $2^{31}$. If X is out of range, flow proceeds along line 432 to step 428 where standard encoding is performed. If X is in range, flow proceeds to step 434 which initializes i to END and the loop of 436–448 will be executed the number of times there are groups of four remaining to the right of the decimal point. Steps 436–448 operate in a similar manner as 378–400 of FIG. 9B except that in step 438, NN(i) is multiplied by 16 because it is known that there are four digits in the group of four as opposed to step 380 of FIG. 9B where NN(i) is multiplied by 2$^{LN}$.

After execution of the loop of steps 436–448 the necessary number of times, flow proceeds along line 450 to step 452 where END is decremented by 1 as the right most group of digits has been eliminated. It is known that it has been eliminated because the list of enumerated digits in step 424 multiplied by 16 ensures that the result of multiplication by 16 will be a value ending with zeros in the ones, tens, hundreds, and thousands places. Step 454 multiplies the integer X by 16 as the decimal portion of the number to be compressed has already been multiplied by 16 in step 338, and adds the carry from the decimal portion times the sign of the number to be compressed to the result. Step 456 resets the carry value to zero as it has been accounted for in step 354. Step 458 increments r by 4 as the number has been multiplied by 2$^4$ (16) and flow loops back along line 460 to step 422.

The loop of FIG. 9C is repeatedly executed until there are no more groups of digits to the right of the decimal point, corresponding to END less than zero in step 422, the right most group of four digits is not in the enumerated list of step 424, or the value of X becomes greater than 4 bytes as determined in step 430. When all digits to the right of the decimal point are eliminated and flow proceeds from step 422 to 464 along line 462, X is examined in step 464 to see if it can be represented using 4 bytes. If it is greater than 4 bytes, standard binary floating encoding must be performed in step 468 or if X is within range, the parameters of the N/2$^r$ are set such that N equals the integer portion of X and r is r and flow returns to the main process, such as main content binary encoding routine 104 which called the numeric compression/encoding routine of FIGS. 9A–11.

When a number is compressed and encoded from a textural representation to a binary representation in SPDL, the encoded number is represented in binary octets. When a number is converted to single precision floating point binary format in SPDL, the type octet is 70 followed by four bytes of the floating point binary representation of the number. When the number is encoded and compressed into the single precision N/2$^r$ format, the type octet is 71 followed by 3 bytes; 2 bytes for N followed by 1 byte for r. When the number is compressed and encoded into double precision N/2$^r$ format, there is an octet type of 72 followed by 5 bytes for the N/2$^r$ representation; N is 4 bytes followed by 1 byte for r. While SPDL does not have a provision for a double precision floating point number, a unique octet type could be easily used to indicate a double precision floating point binary number. For example, if the octet type 73 is not assigned, 73 can be used followed by 8 bytes for the double precision IEEE Standard floating point binary representation.

As numbers encoded in SPDL contain a type octet identifying the type of number to follow, when the binary representation of the number is being decoded or decompressed, the type octet can be easily examined to determine what representation the binary number is in. For example, if 70 is determined to be the octet type, there will be 4 bytes representing the number in the single precision floating point representation. If 71 is the octet type there will be the single precision $N/2^r$ format and if 72 is the octet type, it will be the double precision $N/2^r$ format.

The current invention can be used in any system which receives a textual representation of a number and converts the number to a binary format. The invention is particularly useful in an SPDL system which receives a clear text encoded SPDL file and converts it into a binary encoded SPDL file.

The process of this invention encodes a number into the $N/2^r$ format and otherwise, performs an alternative type of binary encoding. When a double precision number is encoded in the $N/2^r$ format, only 5 bytes are needed to represent the number as compared to 8 bytes for the double precision IEEE 754 standard. Similarly, 3 bytes are needed for the single precision $N/2^r$ format whereas 4 bytes are needed for the IEEE 754 standard single precision format. This reduction in the number of bytes required to represent the number allows data to be stored and transmitted at a faster rate as compared to encoding only using the IEEE standard. Further, a binary SPDL file can be processed much faster than the clear text representation of the same file.

Obviously, numerous modifications and variations of the present invention are possible in light of the above teachings. For example, step 424 of FIG. 9C can be replaced by a step which operates in a similar manner as step 392 of FIG. 9B and multiplies the group of four digits by 16 ($2^4$) and examining if the ones, tens, hundreds, and thousands positions of the product are zero. If the positions in the product are zero, it is known that the group of digits does not prohibit encoding using the $N/2^r$ format. It is therefore to be understood that within the scope of the appended claims, the invention may be practiced otherwise than as specifically described herein.

What is claimed as new and desired by Letters Patent of the United States is:

1. An apparatus for controlling a printer or presentation device by changing a textual representation to an $N/2^r$ binary format, comprising:

a system bus;

page description generating means connected to the bus for generating a textual representation of a page description file having numeric and non-numeric data;

a compressing and encoding apparatus including;

a first converting means connected to the bus for transforming non-numeric data of the page description file to a binary representation;

a second converting means for transforming numeric data of the page description file to a binary numeric representation, including;

memory means connected to the bus for storing a numeric variable r;

initializing means connected to the bus for initializing r as 0;

means connected to the bus for writing to a numeric variable X, a numeric representation of numeric data from the textual representation of the numeric data from the page description file;

a multiplier connected to the bus for multiplying X by 2 an adder connected to the bus for adding 1 to r;

means connected to the bus for determining if X is an integer after X was multiplied by 2 by the multiplier, and if X has become an integer, setting N=X and if X has not become an integer, invoking the multiplier and the adder until X becomes an integer or at least one of X and r go out of predefined ranges stored in a memory; and said apparatus for controlling the printer or presentation device including transmitting means for transmitting a binary representation of numeric and nonnumeric data to the printer or presentation device including X and r such that the binary representation of the numeric and non-numeric data control the printer or presentation device.

2. An apparatus for controlling a printer or presentation device according to claim 1, further comprising:

integer determination means connected to the bus for determining if X is an integer;

means connected to the bus for setting N equal to the value of X if X is an integer;

3. An apparatus for controlling a printer or presentation device according to claim 2, further comprising:

a storage means for storing the binary representation of the numeric data and non-numeric data before the data is transmitted to and controls the printer or presentation device.

4. An apparatus for controlling a printer according to claim 1, further comprising:

standard transformation means connected to the bus for transforming the textual representation of the numeric data from the page description file to a standard binary representation if at least one of X and r go out of the predefined ranges.

5. A method for controlling a printer or presentation device by changing a textual representation to an $N/2^r$ binary format, comprising the steps:

generating a textual representation of a page description file having numeric and non-numeric data;

compressing and encoding the textual representation of the page description file, said compressing and encoding step including the steps of;

transforming the non-numeric data of the page description file in the textual representation to a binary representation;

transforming the numeric data of the page description file in the textual representation to a binary numeric representation, said transforming the numeric data step including the steps of;

initializing a numeric variable r as 0;

writing to a numeric variable X, a numeric representation of numeric data from the textual representation of the numeric data from the page description file;

multiplying X by 2;

adding 1 to r determining if X is an integer after X was multiplied by 2 and if X has become an integer, setting N=X and if X has not become an integer, repeating the multiplying and adding steps until X becomes an integer or at least one of X and r go out of predefined ranges; and said method for controlling the printer or presentation device including the step of transmitting a binary representation of numeric and non-numeric data to the printer or presentation device including X and r such that the binary representation of the numeric and non-numeric data control the printer or presentation device.

6. A method for controlling a printer or presentation device according to claim 5, further comprising the steps of:

determining if X is an integer before the step of multiplying X by 2; and setting N equal to the value of X if X is determined to be an integer before X is multiplied by 2.

7. A method for controlling a printer or presentation device according to claim 5, further comprising the step of:

storing the binary representation of the numeric data and non-numeric data before the data is transmitted to and controls the printer or presentation device.

8. A method for controlling a printer or presentation device according to claim 5, further comprising the step:

transforming the textual representation of the numeric data from the page description file to a standard binary representation if at least one of X and r go out of the predefined ranges.

9. An apparatus for changing the electromagnetic representation of data X from a textual representation to an $N/2^r$ binary format using a computer, comprising:

a system bus;

memory means connected to the bus for storing the variable r;

transformation means connected to the bus for changing X from a textual representation to a numeric representation;

a multiplier connected to the bus for multiplying X by 2;

an adder connected to the bus for adding 1 to r;

means, connected to the bus, for determining if X is an integer after X was multiplied by 2 by the multiplier, and if X is determined to be an integer, setting N=X and if X is determined not to be an integer, invoking the multiplier and adder until X becomes an integer or at least one of X and r go out of predefined ranges stored in a memory.

10. An apparatus for changing the electromagnetic representation of data X from a textual representation to an $N/2^r$ binary format using a computer according to claim 9, further comprising:

means connected to the bus for determining if X is an integer;

means, connected to the bus, for setting N equal to the value of X if X is determined to be an integer.

11. An apparatus for changing the electromagnetic representation of data X from a textual representation to an $N/2^r$ binary format using a computer, according to claim 9, wherein:

the predefined range of r stored in the memory is $0 \leq r \leq 255$; and the predefined range of X stored in the memory is $-2^{31} \leq X \leq 2^{31}-1$.

12. An apparatus for changing the electromagnetic representation of data X from a textual representation to an $N/2^r$ binary format using a computer, according to claim 9, wherein:

the predefined range of r stored in the memory is $0 \leq r \leq 255$; and the predefined range of X stored in the memory is $-2^{15} \leq X \leq 2^{15}-1$.

13. A process for changing the electromagnetic representation of a signal X from a textual representation to an $N/2^r$ binary format using a computer, comprising the steps:

initializing a memory location r as zero;

changing X from a textual representation to a numeric representation;

multiplying X by two;

adding one to r;

a first determining step of ascertaining if X is an integer and if X is ascertained to be an integer, setting N equal to X and terminating said process a second determining step of ascertaining if at least one of X and r are out of predefined ranges;

performing a standard binary encoding on an original textual representation of the signal X if it was determined if at least one of X and r are out of predefined ranges and terminating said process; and repeating the multiplying, adding, first determining, second determining, performing a standard binary encoding and the repeating steps until said process is terminated.

14. A process for changing the electromagnetic representation of a signal X from a textual representation to an $N/2^r$ binary format using a computer, according to claim 13, further comprising the steps:

determining if X is an integer before the multiplying step; and if X was determined to be an integer before the multiplying step, setting N=X and terminating the process.

15. An apparatus for controlling a printer or presentation device, comprising:

a system bus;

page description generating means connected to the bus for generating a textual representation of a page description file having numeric and non-numeric data;

a compression and encoding apparatus including:

a first converting means connected to the bus for transforming non-numeric data from the page description file to a binary representation;

a second converting means connected to the bus for transforming numeric data from the page description file to a binary representation, including:

memory means connected to the bus for storing a numeric variable r;

initializing means connected to the bus for initializing r as 0;

means connected to the bus for writing to a numeric variable X, a numeric representation of numeric data from the textual representation of the numeric data from the page description file;

grouping means connected to the bus for grouping digits of X which are to the right of a decimal point into groups of four consecutive digits and adding one or more trailing zeros to a right portion of the decimal portion of X such that a right most group of digits has four digits;

means connected to the bus for determining if the right most group of four digits allows compression using the $N/2^r$ format and performing a standard binary encoding of the numeric data if the right most group of four digits does not permit compression using the $N/2^r$ format;

means, connected to the bus, for performing arithmetic operations on an integer portion of X and each groups of four consecutive digits such that the integer portion of X and each group of four consecutive digits are multiplied by two raised to a power and a result of each multiplication has added thereto, a carry from a group of digits immediately to the right of the group if a group of four digits to the right of the group exists;

means, connected to the bus, for adding to r, the power to which two was raised to;

said apparatus for controlling the printer or presentation device further comprising transmitting means, connected to the bus, for transmitting to the printer or presentation device the non-numeric and numeric binary encoded and compressed data such that non-numeric and numeric binary data control the printer or presentation device.

16. An apparatus for controlling a printer or presentation device according to claim 15, further comprising:

means connected to the bus for determining if X is an integer and if X is determined to be an integer, setting N=X.

17. An apparatus for controlling a printer or presentation device according to claim 15, wherein:

said means for determining if the right most group of digits permits compression using the $N/2^r$ format determines if the right most group of four digits is in the group comprising 5000, 2500, 7500, 1250, 3750, 6250, 8750, 0625, 1875, 3125, 4375, 5625, 6875, 8125, and 9375.

18. An apparatus for controlling a printer or presentation device according to claim 15, wherein:

the power to which two is raised is 1 if the right most group of digits is 5000, 2 if the right most group of digits is from the group comprising 2500 and 7500, 3 if the right most group is from the group comprising 1250, 3750, 6250, and 8750, and four if the right most group is from the group comprising 0625, 1875, 3125, 4375, 5625, 6875, 8125, and 9375.

19. A process for controlling a printer or presentation device, comprising the steps:

generating a textual representation of a page description file having numeric and non-numeric data;

compressing and encoding the textual representation of the page description file, said compressing and encoding step including the steps of;

transforming the non-numeric data of the page description file in the textual representation to a binary representation;

transforming the numeric data of the page description file in the textual representation to a binary numeric representation, said transforming the numeric data step including the steps of;

initializing a numeric variable r as 0;

writing to a numeric variable X, a numeric representation of numeric data from the textual representation of the numeric data from the page description file;

grouping digits of X which are to the right of a decimal point into groups of four consecutive digits and adding one or more trailing zeros to a right portion of the decimal portion of X such that a right most group of digits has four digits;

determining if the right most group of four digits allows compression using the $N/2^r$ and performing a standard encoding process if the right most group of four digits does not permit compression using the $N/2^r$ format;

performing arithmetic operations on an integer portion of X and the groups of four consecutive digits such that the integer portion of X and each group of four consecutive digits are multiplied by two raised to a power and a result of each multiplication has added thereto, a carry from a group of digits immediately to the right of the integer portion of X and each group of digits;

setting r equal to r plus the power to which two was raised to;

repeating the steps of determining if the right most group of digits permits compression, performing arithmetic operations, setting r equal to r plus the power to which two was raised and the repeating step until all groups of four digits become zero or at least one of X and r go out of predefined ranges;

said method for controlling the printer or presentation device including the step of transmitting a binary representation of numeric and non-numeric data to the printer or presentation device including X and r such that the binary representation of the numeric and non-numeric data control the printer or presentation device.

20. A process for controlling a printer or presentation device, according to claim 19, further comprising the step:

determining if X is an integer before performing the grouping step and if X is determined to be an integer, setting N=X and terminating the process.

21. A process for controlling a printer or presentation device according to claim 19, wherein:

the step of determining if the right most group of digits permits compression using the $N/2^r$ format determines if the right most group of four digits is in the group comprising 5000, 2500, 7500, 1250, 3750, 6250, 8750, 0625, 1875, 3125, 4375, 5625, 6875, 8125, and 9375.

22. A process for controlling a printer or presentation device according to claim 19, wherein:

the power to which two is raised is 1 if the right most group of digits is 5000, 2 if the right most group of digits is from the group comprising 2500 and 7500, 3 if the right most group is from the group comprising 1250, 3750, 6250, and 8750, and four if the right most group is from the group comprising 0625, 1875, 3125, 4375, 5625, 6875, 8125, and 9375.

23. A process for changing the electromagnetic representation of data X from a textual representation to an $N/2^r$ binary format using a computer, comprising the steps:

(a) setting r equal to zero;

(b) determining if X is an integer and if X is determined to be an integer, setting N=X and terminating the process;

(c) grouping digits of X which are to the right of a decimal point into groups of four consecutive digits and adding one or more trailing zeros to a right portion of the decimal portion of X such that a right most group of digits has four digits;

(d) determining if the right most group of four digits allows compression using the $N/2^r$ and terminating the process if the right most group of four digits does not permit compression using the $N/2^r$ format;

(e) performing arithmetic operations on an integer portion of X and the groups of four consecutive digits such that the integer portion of X and each group of four consecutive digits are multiplied by two raised to a power and a result of each multiplication has added thereto, a carry from a group of digits immediately to the right of X and each group setting r equal to or plus the power to which two was raised to in step (e);

(f) repeating steps (d) and (e) until all groups of four digits become zero or X or r go out of predefined ranges;

(g) transmitting to and controlling the printer or presentation device using X and r when all groups of four digits become zero.

24. An apparatus for changing the electromagnetic representation of data X from a textual representation to the $N/2^r$ binary format using a computer, comprising:

means for determining if X is an integer;

means for setting N=X and r=0 if X has been determined to be an integer;

means for determining a position number in a decimal portion of X of a right most non-zero digit;

means for dividing the position number of the right most non-zero digit by four and storing a remainder;

means for setting r equal to the value of the stored remainder;

means for adding 0 or more trailing zeros to X until a number of digits to the right of the decimal point is evenly divisible by four;

means for consecutively grouping the digits to the right of the decimal point into groups of four digits;

means for determining if a right most group of four digits allows compression using the $N/2^r$ format;

means for multiplying the right most group of four digits by two raised to the value of the stored remainder and dividing a product of the multiplication by 10,000 and storing an integer portion of a quotient from the division as a carry;

means for multiplying, only if a next right most group of digits exists, the next right most group of digits by two raised to the value of the stored remainder and adding thereto the stored carry;

means for storing as the carry, only if a next right most group of digits exists, an integer portion of a product of a next right most group of digits raised to the value of the stored remainder plus the stored carry divided by 10,000;

means for setting X equal to an integer portion of X multiplied by two raised to the value of the stored remainder and adding thereto the carry;

means for determining if non-zero groups of four digits exist to the right of the decimal point and if no groups exist, setting N=X;

means for multiplying the right most group of non-zero digits by 16 and storing an integer portion of the product divided by 10,000 as the carry;

means for multiplying, only if a next right most group of digits exists, the next right most group of digits by 16 and adding thereto the stored carry, and storing as the carry, an integer portion of the sum of the product and the stored carry, divided by 10,000;

means for setting X equal to X multiplied by 16 plus the value of the stored carry; and means for transmitting X and r to a printer or presentation device which is controlled by X and r.

25. A process for changing the electromagnetic representation of data X from a textual representation to the $N/2^r$ binary format using a computer, comprising the steps:

(a) determining if X is an integer and if X is determined to be an integer, setting N=X, r=0 and terminating the process;

(b) determining a position number in a decimal portion of X of a right most non-zero digit;

(c) dividing the position number of the right most non-zero digit by four and storing a remainder;

(d) setting r equal to the value of the stored remainder;

(e) adding 0 or more trailing zeros to X until a number of digits to the right of the decimal point is evenly divisible by four;

(f) consecutively grouping the digits to the right of the decimal point into groups of four digits;

(g) determining if a right most group of four digits allows compression using the $N/2^r$ format and terminating the process if the right most group of four digits does not permit compression using the $N/2^r$ format;

(h) multiplying the right most group of four digits by two raised to the value of the stored remainder and dividing a product of the multiplication by 10,000 and storing an integer portion of a quotient from the division as a carry;

(i) multiplying, only if a next right most group of digits exists, the next right most group of digits by two raised to the value of the stored remainder and adding thereto the stored carry;

(j) storing as the carry, only if the next right most group of digits exists, an integer portion of the result of step (i) divided by 10,000;

(k) repeatedly performing steps (i) and (j) on successive next right most groups of four digits, if successive next right most groups of four digits exists;

(l) setting X equal to an integer portion of X multiplied by two raised to the value of the stored remainder and adding thereto the carry;

(m) determining if non-zero groups of four digits exist to the right of the decimal point and if no groups exist, setting N=X, controlling a printer or presentation device using r and N, and terminating the process;

(n) determining if a right most group of non-zero digits allows compression using the $N/2^r$ format and terminating the process if the right most group of non-zero digits does not permit compression using the $N/2^r$ format;

(o) multiplying the right most group of non-zero digits by 16;

(p) storing an integer portion of a product from step (o) divided by 10,000 as the carry;

(q) multiplying, only if a next right most group of digits exists, the next right most group of digits by 16 and adding thereto the stored carry;

(r) storing as the carry, an integer portion of the result of step (q) divided by 10,000;

(s) repeatedly performing steps (q) and (r) on successive next right most groups of four digits, if successive right most groups of four digits exists;

(t) setting X equal to X multiplied by 16 plus the carry value;

(u) repeating steps (m) through (t) until the process is terminated by steps (m) or (n).

* * * * *